(12) United States Patent
Negussu et al.

(10) Patent No.: US 10,261,170 B2
(45) Date of Patent: Apr. 16, 2019

(54) IMAGE ANALYSIS AND RADAR DETECTORS

(71) Applicant: Valentine Research, Inc., Cincinnati, OH (US)

(72) Inventors: Michael Negussu, Cincinnati, OH (US); Richard L. Dickerson, Union, KY (US); Gary E. Carrelli, Cincinnati, OH (US); John D. Hiers, Connersville, IN (US)

(73) Assignee: Valentine Research, Inc., Cincinnati, OH (US)

( * ) Notice: Subject to any disclaimer, the term of this patent is extended or adjusted under 35 U.S.C. 154(b) by 543 days.

(21) Appl. No.: 14/727,913

(22) Filed: Jun. 2, 2015

(65) Prior Publication Data

US 2016/0356880 A1 Dec. 8, 2016

(51) Int. Cl.
*G01S 7/22* (2006.01)
*G01S 7/02* (2006.01)

(52) U.S. Cl.
CPC .................................... *G01S 7/022* (2013.01)

(58) Field of Classification Search
CPC ..... G01S 7/00; G01S 7/22; G01S 7/40; G01S 7/4004; G01S 7/42; G01S 13/867; G01S 13/86; G01S 2013/9353; G01S 2013/9357; G01C 21/26; G01C 21/34; G01C 21/3476; G01C 21/3652; G01C 21/3611; G01C 21/3679; G01C 21/3694; G01C 11/04; G01C 11/00; G01C 11/02; G01C 11/06; G01C 11/10; G08G 1/052; G08G 1/0112; G08G 1/09623; G08G 1/096733; G08G 1/096883
See application file for complete search history.

(56) References Cited

U.S. PATENT DOCUMENTS

| | | | |
|---|---|---|---|
| 6,560,529 B1 | 5/2003 | Janssen | |
| 6,696,978 B2 | 2/2004 | Trajkovic et al. | |
| 6,813,545 B2 | 11/2004 | Stromme | |
| 7,068,844 B1 | 6/2006 | Javidi et al. | |
| 8,223,038 B2 | 7/2012 | Bauer et al. | |
| 8,255,155 B1* | 8/2012 | Crane | G08G 1/096716 340/905 |
| 8,466,806 B2 | 6/2013 | Schofield | |
| 8,525,723 B2 | 9/2013 | Orr et al. | |
| 8,743,202 B2 | 6/2014 | Schick et al. | |

(Continued)

OTHER PUBLICATIONS

"Speed Limit including no-overtaking indicator." BMW Technology Guide. <www.bmw.com/com/en/insights/technology/technology_guide/articles/speed_limit_info.html?source=index&article=speed_limit_info> Printed Aug. 19, 2014. 1 page.

(Continued)

*Primary Examiner* — Timothy A Brainard
*Assistant Examiner* — Daniel P Malley, Sr.
(74) *Attorney, Agent, or Firm* — Stevens & Showalter, LLP

(57) ABSTRACT

An apparatus for a vehicle includes a radar detector configured to detect a police radar signal and a receiver configured to receive information about an image of an environment of the vehicle. A controller in communication with the radar detector and the receiver is configured to change at least one operating characteristic of the radar detector based on the received information.

34 Claims, 4 Drawing Sheets

(56) References Cited

U.S. PATENT DOCUMENTS

| | | | |
|---|---|---|---|
| 2005/0002558 A1* | 1/2005 | Franke | B60R 1/00 |
| | | | 382/154 |
| 2009/0243825 A1* | 10/2009 | Schofield | B60Q 1/346 |
| | | | 340/435 |
| 2012/0148105 A1 | 6/2012 | Burry et al. | |
| 2012/0150428 A1 | 6/2012 | Niem et al. | |
| 2013/0124061 A1* | 5/2013 | Khanafer | G06F 17/00 |
| | | | 701/70 |
| 2013/0207829 A1* | 8/2013 | Kabler | G01S 7/022 |
| | | | 342/20 |
| 2014/0203959 A1* | 7/2014 | Kriel | G01S 13/867 |
| | | | 342/52 |
| 2014/0204215 A1* | 7/2014 | Kriel | H04N 7/181 |
| | | | 348/159 |
| 2014/0266853 A1* | 9/2014 | Orr | G01S 7/022 |
| | | | 342/20 |
| 2015/0260851 A1* | 9/2015 | Orr | G01S 7/022 |
| | | | 342/20 |
| 2016/0171893 A1* | 6/2016 | Chen | G08G 1/167 |
| | | | 701/300 |
| 2016/0292933 A1* | 10/2016 | Sprock | G07C 5/008 |

OTHER PUBLICATIONS

"New Camera-Based Collision Alert Debuts on GMC Terrain." GMC News United States. <media.gm.com/media/us/en/gmc/news.detail.html/content/Pages/news/us/en/2011/Sep/0929_terrain.html> Printed Sep. 9, 2011. 2 pages.

* cited by examiner

US 10,261,170 B2

IMAGE ANALYSIS AND RADAR DETECTORS

FIELD OF THE INVENTION

The present disclosure relates generally to police radar detectors used in motor vehicles and, more particularly, to complementing radar detector functionality with image analysis techniques.

BACKGROUND

Radar signals have been commonly used by police for some time to determine the speed of motor vehicles. In response to radar speed monitoring and to signal motor vehicle operators when such monitoring is taking place, police radar detectors have likewise been used for almost a coincident period of time. Currently available radar detectors indicate the presence of radar signals, the frequency band of detected signals, the direction from which the radar signals originate and the relative field strength of detected signals. In addition, the radar detectors can also display information about their mode of operation and the number of detected radar signals at any given time. The widely varying operating procedures for using police radar and the proliferation of other signals assigned to the same frequency bands as police radar has led to the need for police radar detectors which give more information than has been provided in the past.

Additionally, vehicle based cameras have become more prevalent to assist a driver in detecting potential hazards while backing-up, changing lanes or otherwise operating the vehicle. Similarly, the use of hand-held devices with considerable processing capabilities has become almost ubiquitous. These additional technologies offer new opportunities for increasing the different types of data that can be shared with a radar detector and for enhancing operation of a radar detector based on that data.

SUMMARY

One aspect of the present disclosure relates to an apparatus for a vehicle that tides a radar detector configured to detect a police radar signal and a receiver configured to receive information about an image of an environment outside or inside the vehicle. A controller in communication with the radar detector and the receiver is configured to change at least one operating characteristic of the radar detector based on the received information.

Another aspect of the present disclosure relates to a method for operating a radar detector in a vehicle that includes scanning a plurality of frequencies, by the radar detector, to detect a police radar signal and receiving information about an image of an environment outside or inside the vehicle. The method also includes changing at least one operating characteristic of the radar detector based on the received information.

BRIEF DESCRIPTION OF THE DRAWINGS

While the specification concludes with claims particularly pointing out and distinctly claiming the invention of the present disclosure, it is believed that the present disclosure will be better understood from the following description in conjunction with the accompanying Figures, in which like reference numerals identify like elements, and wherein:

DETAILED DESCRIPTION

In the following detailed description of the preferred embodiment, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of the present disclosure.

An exemplary radar detector capable of detecting radar signal strength and the direction of the radar signal source is fully described in U.S. Pat. No. 5,083,129, which is assigned to the same assignee as the present application and is incorporated herein by reference in its entirety. Also, a multi-band radar detector capable of determining a relative direction of a radar source is more fully described in U.S. Pat. No. 7,450,051, which is assigned to the same assignee as the present application and is incorporated by reference herein in its entirety.

Figure 1:
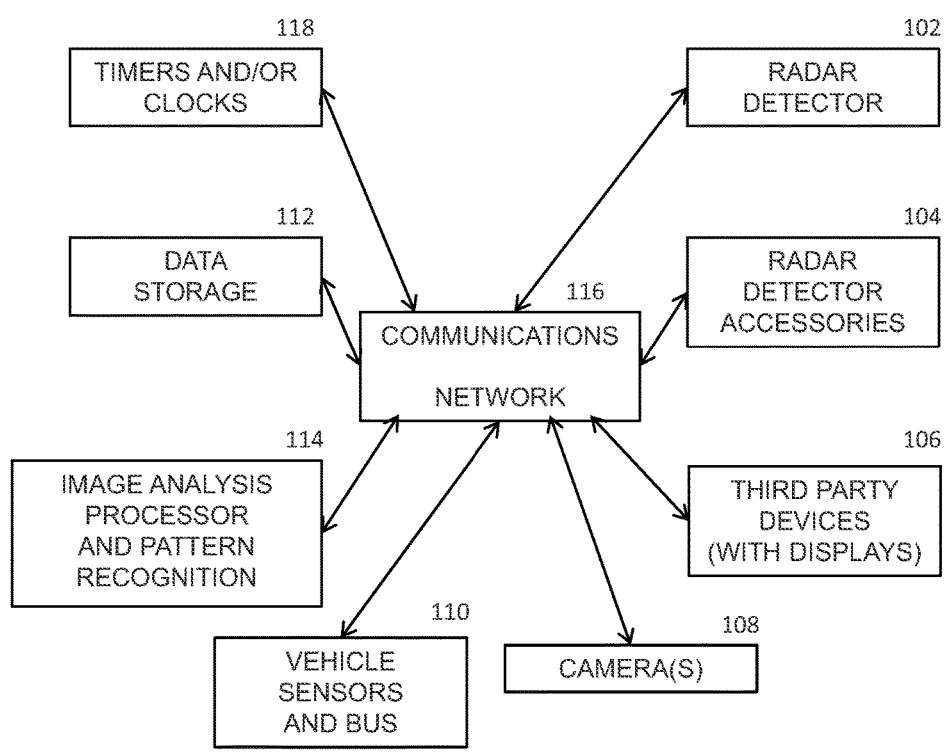
FIG. 1 provides a high-level functional block diagram of an environment in which a vehicle-based police radar detector can operate in accordance with the principles of the present disclosure.

FIG. 1 provides a high-level functional block diagram of an environment in which a vehicle-based police radar detector can operate in accordance with the principles of the present disclosure. In particular a police radar detector 102 similar to those described in the above-referenced, and incorporated, patents can be present that monitors one or more police radar bands to sense radar signals incident upon a receiver that typically comprises one or more antennas (e.g., a generally forwardly directed antenna and a generally rearwardly directed antenna). Although, it is to be understood that the antenna directions can be different for given applications and as a result of existing or future requirements. Signals received by the antennas can be passed to a switching circuit that can connect signals from the antennas to a detector circuit. The detector circuit can generate radar identification signals identifying incoming radar signals. As is known in the art, the detector circuit can differentiate between likely police radar signals and nuisance radar signals emanating from other radar sources.

As described in detail in the above-incorporated patents, the radar detector 102 comprises any appropriate radar detector circuit capable of generating a received signal strength indicator (RSSI) output signal which indicates the signal strength of radar signals detected by the detector circuit. The switching circuit and radar detector circuit can take a wide variety of forms and can include amplifiers, mixers, diplexers, and other circuitry commonly used in the radar detector field as are well known to those skilled in the art. Also, a microprocessor, or similar processing device, can control the switching circuit to selectively connect signals from the antennas to the detector circuit. Operation and control of the detector circuit, for example for the detection of radar signals in different frequency bands allocated to police radar signals, are also performed by the microprocessor. The microprocessor can additionally control alarm circuits to communicate information regarding detected radar signals to the operator of a motor vehicle utilizing the radar detector 102 by means of one or more alarm tones and/or visual indicators which are included within the alarm circuits. In particular, the microprocessor can generate control signals for the alarm circuits and any visual displays whether internal or external to the radar detector 102.

Along with the radar detector 102 there can be additional radar detector accessories 104 that communicate with the radar detector 102. Example accessories 104 can include remote displays, communications modules (e.g., Bluetooth capabilities, proprietary network protocols, etc.), power supply modules, OBD-II connectors, and control modules that affect operation of the radar detector.

Typically the radar detector 102 and radar detector accessories 104 are provided by the same manufacturer or closely associated businesses. In addition to the accessories 104, other third-party devices 106 may also be present in the environment of FIG. 1. These devices can include laptop computers, hand-held computer devices, smart-phones, tablets, and the like. These devices 106 generally have their own operating system and run applications or "apps" that allow communication with one or more of the other components (for example, the radar detector 102) shown in FIG. 1. In particular, the devices 106 may typically include a display that provides a user interface whereby an operator of the vehicle can provide data or instructions to the radar detector 102 and can view information received by one or more of the devices 106.

A camera 108 is depicted in FIG. 1 and can include a wide variety of different image capturing devices. The camera 108 can also comprise a plurality of different cameras located at various positions within or outside the vehicle. One of ordinary skill will readily recognize that the camera 108 may be part of one of the devices 106, for example a smartphone, or may be one of the accessories 104 available from a maker of the radar detector 102. Thus, although the camera 108 is shown as a separate functional block in FIG. 1 it may physically be a part of one of the other functional blocks depicted and may be referred to herein as a camera or as cameras.

The vehicle can also include its own sensors and bus 110. For example, signals from sensors or devices attached to a CAN-bus or OBD-H bus can be available to the devices 106, the radar detector 102, the accessories 104, and the other functional blocks shown in FIG. 1. Similarly, devices implementing these functional blocks can also transmit information over the vehicle bus as well. Specific brands of vehicles can also provide additional communications busses and techniques (e.g., FORD SYNC) that can be utilized in accordance with the principles of the present disclosure. For example, many vehicles include an infotainment screen through which vehicle, and other, information is conveyed to vehicle occupants and this capability can also be used by devices implementing the various functional blocks of FIG. 1.

Processing and analysis of images from one or more cameras 108 can be accomplished via an image analyzer 114. As explained in more detail below, the image analyzer 114 functional block encompasses processing software and hardware that can receive images (either individual images or a continuous stream of images), filter them, perform image analysis functions on the images, perform object, scene or textual recognition within an image scene, and provide metadata about the contents of an image scene. The image analyzer 114 is shown as a separate functional block in FIG. 1 but may actually be a part of one (or more) of the cameras 108, part of one (or more) of the third-party devices 106 or one (or more) of the accessories 104. If the radar detector 102 is provided with sufficient processing capability so that its primary functions of detecting radar signals and providing alerts are not adversely affected, the image analyzer 114 may be part of the radar detector 102.

As suggested above, all the capabilities and functions of the image analyzer 114 do not have to be accomplished by a single, separate physical device. For example, the camera (s) 108 may provide capabilities to filter images such that saturation and hue are normalized in a way that can assist in later image analysis. Smoothing and averaging techniques can also be employed to remove noise from images captured by the camera(s) 108 before additional analysis by the image analyzer 114 is performed.

Data storage 112 can be present in the environment of FIG. 1 as a separate storage device that is accessible by one or more of the other depicted functional blocks. Additionally, each of the functional blocks can have its own internal data storage as well even though it is not explicitly illustrated in FIG. 1. The data storage 112 and/or any internal data storage can store images, portions of images, models of one or more objects useful for analyzing image scenes, operating profiles of the various functional blocks (e.g., resolution and frame rate of camera 108, scanning frequency profiles for the radar detector 102, etc.), and information about what devices 106 and what accessories 104 are present within the environment of FIG. 1. The data storage 112 can also store information about highways, known speed traps, posted speed limits, construction information, and other potentially transient data for which a user can download updates.

Data storage 112 and/or internal data storage of the radar detector 102, one of the accessories 104 or one or more of the other depicted functional blocks can include rules or instructions that are associated with particular images or portions of images. For example, a rule may be to mute an alarm or warning based on a speed limit sign detected in an image. Various rules and instructions of this type are discussed in detail below but, in general, can be considered as specifying how operation of a radar detector, its display, or warnings can be adjusted based on analysis of an image by the image analyzer 114.

Timers and/or clocks 118 may also be beneficial to communicate with one or more of the other functional blocks of FIG. 1. Also, one of ordinary skill will recognize that one or more of the other functional blocks may already include a clock or a timer such that a separate device or software is not necessary to provide such functionality. A clock can, of course, provide information about a time of day but it can also be used to determine an amount of time between two events. However, additional timers can also be used if the timing of multiple events is desired.

As for communication of information between the various functional blocks of FIG. 1, a communications network 116 is illustrated as providing this functionality. However, one of ordinary skill will recognize that the network 116 can be implemented in a variety of different ways without departing from the scope of the present disclosure. For example, the accessories 104 can communicate with the radar detector 102 using a proprietary protocol and proprietary connectors. Also, one of the accessories 104 can be a bridge or translator that can communicate via non-proprietary methods (e.g., using BLUETOOTH, via the OBD-II bus, etc.). Thus, one example of physical connectivity that can be provided by the communications network abstraction represented by the communications network 116 of FIG. 1 is for the camera 108 to be a vehicle camera connected to a CAN bus to which one of the accessories 104 interfaces. Another one of the accessories 104 can provide a BLUETOOTH interface to which at least one of the third-party devices 106 can pair. An application on one of the devices 106 can provide a user interface which displays images from the camera 108 and controls for the radar detector 102. Thus, the communications network 116 in FIG. 1 is meant to encompass both direct and indirect paths of communication between the various functional blocks of FIG. 1.

Figure 2:
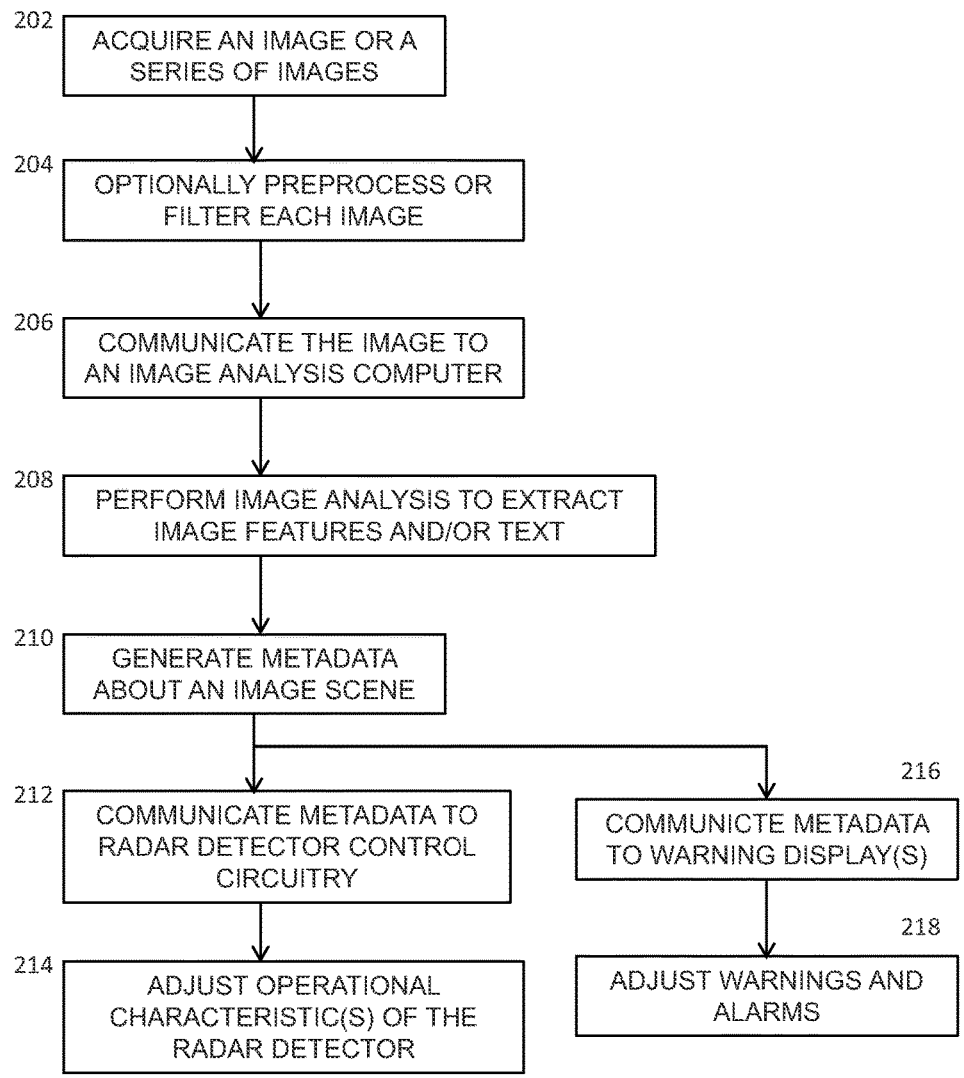
FIG. 2 depicts a flowchart of an exemplary method of complementing radar detector functionality with image analysis techniques in accordance with the principles of the present disclosure.

FIG. 2 depicts a flowchart of an exemplary method of complementing radar detector functionality with image analysis techniques in accordance with the principles of the disclosure of the present application. In step 202, an image or a series of images are captured using an image acquisition device such as a camera. If a series of images are captured then the following image analysis steps can be performed on each image in the series. Based on the processor and computing capabilities allocated for image analysis, fewer than all the images of a series may be analyzed. For example, if images are captured at a rate of 30 frames per second (fps), beneficial results of image analysis may be achieved by only analyzing 10 fps. Thus, every third frame in the series of images is analyzed and the others ignored. The size of an image (e.g., the number of pixels) and/or the color depth of the image (e.g., 24-bit) may be considered when determining how many frames in a series of images to analyze.

In the discussion herein, the terms "frame" and "image" are used interchangeably to refer to one image in a series of images. Also, the phrase "image scene" and "image" can be interchanged but an "image scene" is generally considered a higher level of abstraction because an "image" is generally comprised of pixels while an "image scene" is comprised of objects such as "signs", logos", "vehicles", etc. However, describing an "image" as having particular text (e.g., "speed limit") is merely a shorthand way of describing the "image scene" as having that text.

An optional step 204 can be performed which pre-processes or filters an image (e.g., apply a Gaussian filter, correct color balance, etc.) before detailed analysis of the image scene is performed. The image can then, in step 206, be communicated to an image analysis computer. The image analysis computer can be a general purpose processor with software applications to perform various known image analysis algorithms. Alternatively, a dedicated digital signal processor (DSP) specialized to perform image analysis routines and techniques may be utilized as well. The image analysis computer may be an integral part of the image acquisition device or may be a separate component connected via a network or other communications channel. In any event, an image is provided to the image analysis computer which, in step 208, performs image analysis of that image. As described more fully below with respect to FIG. 3, the image analysis step can be performed in two stages in accordance with the principles of the disclosure of the present application.

One of ordinary skill will recognize that there are many known algorithms, routines, and techniques for performing analysis of an image. Edge detection, for example, is typically used to separate an image scene into distinct objects that can be individually analyzed. Furthermore, once an object is isolated in one image, that object can be tracked in additional images in a series to determine information about movement of that object or movement of the image acquisition device. Optical character recognition (OCR) is another well-known technique for extracting text from an image. Known OCR techniques not only can extract individual characters but can also organize them in words and phrases. Closely related to many OCR algorithms are natural-language processing algorithms that allow OCR extracted text to be "understood" in the context in which they occur in an image scene.

Image analysis can also involve using models of known objects to aid in the speed and accuracy of the image analysis. For example, interstate signs, mile marker posts and speed limit signs all include numerals. However, the shapes (e.g., shield, very rectangular, or generally square) distinguish the three types of signs. Thus, a model of these three shapes can be stored by the image analysis computer to aid in identifying what numerals in an image scene might refer to. Similarly, company logos, car company emblems, vehicle silhouettes, can also be stored as models that can be used when analyzing images. Thus, the data storage 112 of FIG. 1 may store images, metadata about images, and other data useful in performing image analysis and pattern recognition.

Once an image is analyzed in step 208, the image analysis computer can generate metadata about the image based on the extracted features and text. For example, metadata about an image can include: "the image is of a construction zone", "the image includes a WALMART store", "the image includes a BMW next to the vehicle", "the image includes an 'Interstate 95' sign", "the image matches at least a portion of a previously stored image", "the image indicates the current speed limit is '70'", etc.

Once metadata is generated, it can be communicated to radar detector control circuitry (in step 212) and potentially be communicated to separate display(s) or warning devices (in step 216). The radar detector control circuitry can modify or adjust, in step 214, operational behavior of the radar detector based on the image metadata. For example, if a nearby vehicle is identified in an image that is known to have sideways crash prevention radar at a particular frequency, then the radar detector sweep routine can be adjusted to omit that frequency while that vehicle is nearby. Alternatively, similar metadata could be used, in step 218, to merely change the warnings and alarms such that the radar detector frequency sweep remains the same but any alarm or warning that is a result of a signal detected in a particular band is suppressed.

Figure 3:
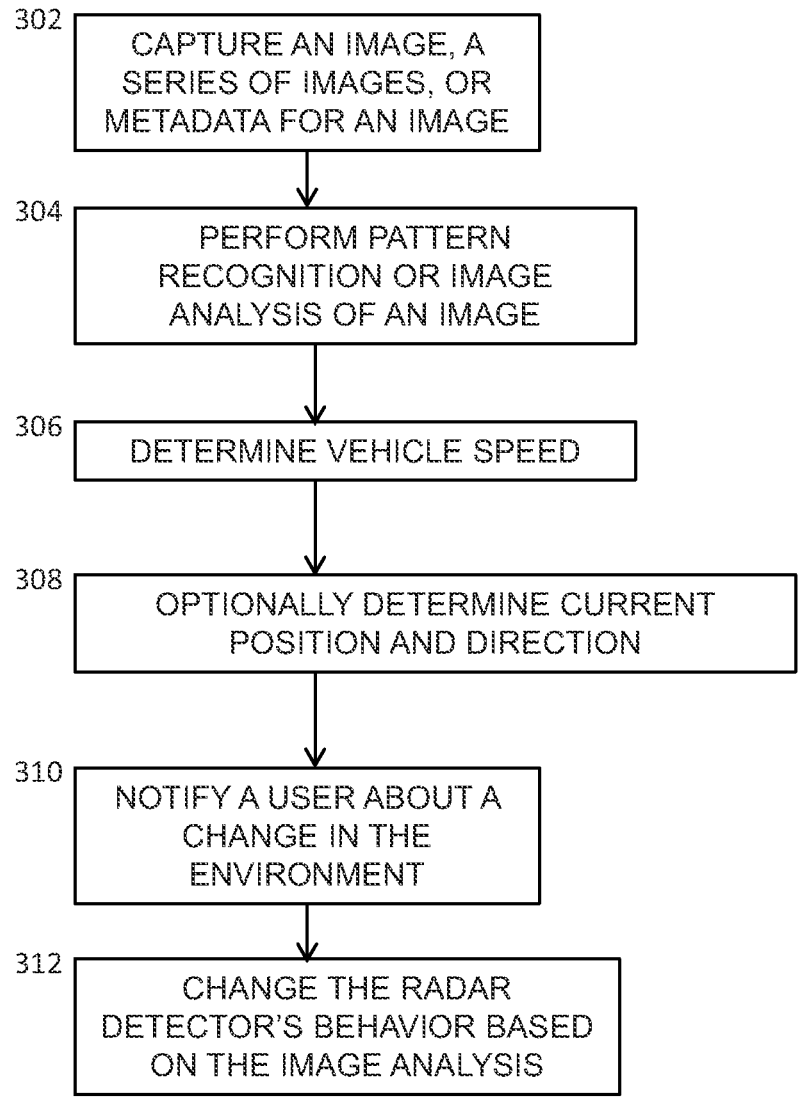
FIG. 3 depicts a flowchart of an exemplary framework with six conceptual steps for complementing radar detector functionality with image analysis techniques in accordance with the principles of the present disclosure.

FIG. 3 depicts a flowchart of an exemplary framework with six conceptual steps for complementing radar detector functionality with image analysis techniques in accordance with the principles of the present disclosure. In general, this framework can be referred to as an imaging and analysis system. Referring to the framework of FIG. 3, each of the six steps can be described in more detail. In particular, in the description below, reference may be made to a tablet, smartphone, or other computing device that can execute an app that provides a user interface.

The app may be an app that communicates with a radar detector to allow a user to control the operation of the radar detector and its warnings and alarms or the app can be a separate app that provides information about image analysis and pattern recognition in accordance with the principles of the disclosure of the present application. Features described below as configurable or user selectable can typically be accomplished using the user interface of the app. However, in addition, some hardware devices may have their own capabilities to change configurable settings separate from the app.

The framework of FIG. 3 includes six major functions: capture images (step 302), perform image analysis and pattern recognition (step 304), determine a vehicle's speed (step 306), optionally determine a vehicle's position and direction (step 308), notify a vehicle operator about a change in the environment (step 310), and modify a radar detector's behavior based on the image analysis (step 312).

Capture Images (Step 302)

As mentioned above, an image or a series of images can be captured via a smartphone camera, a vehicle's imaging system, a camera included as part of a radar detector, a camera that is part of a third party device or a camera that is part of a radar detector accessory.

A camera can acquire an image or a series of images but an accessory, a third party device, or an app on a smartphone can not only acquire images but also analyze the images to provide metadata within an image. For example, an accessory with a camera may be developed that can provide an image and/or image metadata to a radar detector or application. Because the radar detector manufacturer and the accessory developer are likely closely associated, the transfer of images and metadata can be accomplished using proprietary software, hardware interfaces, and network protocols. For third party devices, the device would likely include a published application programming interface (API) or an industry standard transfer protocol to provide images and/or image metadata.

Additionally, images can be captured by one or more of these devices in a variety of different formats. Each image format may have its own benefits and drawbacks, so the image format used when capturing an image can vary depending on the image source (e.g., camera, smartphone, accessory), the available resources of that device and any image analysis processors, and the overall architecture of the imaging and analysis system. Characteristics related to image format that can be considered include image quality, usage of processing resources, and available data transfer rate.

It is beneficial to capture the smallest image that will still allow accurately recognizing any desired patterns and will reduce or minimize the time and memory needed for encoding, decoding and analyzing the image. Another consideration is the time required to transfer the image from an image acquisition device, or image capture device, to the image analysis system. If the image capture device and analysis system are together, in a smart phone for example, then this consideration is not as critical as when a vehicle bus or other network connection is used to transfer captured images.

Raw image data, for example, may not require significant encoding/decoding, but may have a larger data size than various compressed image formats and, therefore, will take longer to transfer. MJPEG streams are relatively easy to encode/decode but typically have larger sizes than other streaming methods and, thus, will take longer to transfer. There are also temporal encoded formats (e.g., MPEG-4, H.264) that can reduce transfer times but utilize increased resources for encoding/decoding. Any of these three types of image formats, as well as others, are contemplated within the scope of the disclosure of the present application.

As for sampling rate (i.e., how often are images captured), this can be a user configurable setting and can be selected to balance between accuracy, response time and resource use. The sample rate may also be dynamically changed based on the current environment. A lower sample rate will tax system resources less but have a relatively slower response time that may miss some changes to a driving environment. A higher sample rate will have a faster response time but will utilize system resources more heavily. Thus, the sample rate may vary based on the current speed of a vehicle with faster speeds corresponding to faster sample rates.

In addition to different formats, color images as well as gray scale images may be utilized in accordance with the principles of the disclosure of the present application. While color image sizes will typically be greater than that of gray scale images, distinguishing color may be beneficial in more accurately analyzing image scenes. For example, in addition to different shapes, interstate signs are generally a different color (e.g., blue) than exit signs (e.g., green).

Perform Image Analysis (Step 304)

Image analysis can include traditional techniques for extracting objects, text, and metadata from an image and can also include performing pattern recognition on the metadata to determine how an environment of a radar detector (or the vehicle with the radar detector) is changing.

Thus, image analysis and pattern recognition are closely related to one another. Image analysis can be performed on a current image or frame so that metadata about that image can be determined. This metadata can then be compared to that of earlier analyzed images in order to determine similarities between the current image and previously captured images. For example, street signs can be identified within an image and the text of the names of the street can be extracted. Based on the different street names that are visible in the image, a search can be performed for whether those same street names are associated with any previous images. Thus, rather than comparing image pixels to image pixels, a similarity between two images can be accomplished by comparing metadata from the two images with one another (i.e., pattern recognition).

While embodiments of the disclosure of the present application contemplate a wide variety of image analysis and object extraction techniques that are known in this field, specific categories of image analysis contemplated include optical character recognition (OCR) that can identify letters, words, and textual context of certain words; edge detection; and object detection.

For example, determining the proximity of words to each other allows recognizing that "Exit 31" is different than "Exit Now To Visit BASKIN ROBBINS 31 Flavors". In addition to known word position relative to one another, a position of text within an image may also provide useful metadata for analysis and pattern recognition. The "position of text" within an image encompasses both a location in the image itself (e.g., top-right quadrant, middle-left portion, etc.) but also can include its relative position to other image objects such as, for example, edges within the image. For example, the numerals "60" may be determined to be within the context of four edges that generally form a rectangle. Thus, the metadata of the image might include information that identifies that the image includes "60" as text on a roadside sign. Depending on whether other nearby text is "Speed Limit", "Mile", or "Exit", the text can be used to determine if the "60" refers a speed limit, a mile maker, or an exit number and that information stored as metadata as well.

Object detection and analysis refers to a number of different methods and techniques to identify various objects that might be in a captured image scene. Vehicle silhouettes can help identify the presence of nearby construction vehicles, for example, or to identify a make and/or model of a nearby vehicle. Identifying store logos, vehicle logos and various trademarked symbols can be used, for example, to determine a type of vehicle nearby or if a store or other spurious radar source is nearby.

One use of edge detection may be to help reduce false triggers by modifying which signals the radar detector generates alerts for. For example, WALMART and other stores are a common source of false alerts in certain frequency bands. Therefore, if image analysis and pattern recognition performed on an image reveals the presence of a WALMART sign, then the radar detector's behavior can be adapted to mute or hide alerts with certain characteristics (e.g., duration, frequency, etc.). However, it would not be beneficial to mute or hide alerts when the vehicle is following a WALMART truck with the WALMART logo on its back. Edge analysis of the image and the structure surrounding the WALMART text in the image can be used to determine if the context is that of a sign or a truck. Alternatively, the relative speed at which the WALMART text is moving between image frames can also be used to distinguish between a sign and a truck. If the WALMART text has an apparent movement near the speed that the vehicle is traveling, then the text is likely part of a sign. However, if the apparent speed the text is moving is closer to zero, then the text is probably part of a logo on a nearby truck traveling in the same direction as the vehicle.

Another example use of edge detection can be to help identify road signs such as, for example, identifying the shield outline commonly used to indicate U.S. interstates. Information about an interstate on which the vehicle is traveling may be used in conjunction with other data to establish a location and/or direction of the vehicle. For example, the interstate number may be extracted from an image and a database lookup reveals whether it is a north/south route or an east/west route. Image metadata about a most-recently encountered mile-marker data can indicate a location of the vehicle and metadata from a series of images can reveal whether the mile-marker numbers are increasing or decreasing, thereby indicating a direction of the vehicle.

In the description herein, "scene recognition" can be considered to focus mainly on determining a similarity between at least portions of two images. As is known in the art, the image pixel data from one image can be compared to the image pixel data from a different image and a score, or confidence value, can be calculated which indicates similarity between the two sets of image pixel data. Typically, an image can be segmented into different objects or regions and two images that have a similar set of objects are considered to be similar. The phrase "pattern recognition", as used herein, focuses more on the metadata that is associated with, or extracted from, an image. Thus, "scene recognition" and "pattern recognition" can be used together or separately to analyze an image and determine if it is similar to, or "matches", a previously encountered image.

Lighting difference between day and night and seasonal changes may affect the scene recognition more than pattern recognition involving mainly metadata. In pattern recognition steps, reliance on street signs will likely not be as adversely affected by changing conditions as scene recognition steps that rely on more than just the metadata. For example, extracting the metadata that indicates the image includes a sign with the text "Speed Limit 55" will allow recognition of the current speed limit (and possibly change a radar threshold value). Street signs are designed to have high contrast in all conditions, so the OCR algorithms utilized as described herein are likely to work well under most driving conditions. However, recognizing a scene can require more than just OCR. For example, a snow covered intersection on a cloudy January evening looks radically different than the same intersection on a bright day in July at noon.

Thus, when comparing scenes, a confidence spectrum between 0% and 100% can be used to describe whether or not two scenes match. A 0% confidence level means there is no match. A 100% confidence level means there is an exact match. A predetermined threshold confidence level can then be defined to determine when to take action for a recognized scene (e.g., mute alerts). This predetermined action threshold can be configured by the user or hard coded into the system.

One example method to perform scene recognition is to do so in two stages. The first stage of scene recognition would be to compare the metadata associated with the current image to the metadata for a stored image. Once a current image is analyzed and its metadata identified, the comparison of the generally textual/numerical metadata can occur relatively quickly. This stage can be used to establish a first baseline confidence level before comparing the actual image data. As mentioned above, because the metadata is mainly OCR information, this stage will be less reliant on lighting conditions than comparison of actual images. For example, one or more recognized street names can heavily influence the confidence level in a match between two images even under different lighting conditions.

Using the pattern recognition steps, as described herein, various types of street signs and their contents can be identified when such signs are in the image. Pattern recognition can involve analysis of all text in the image in conjunction with the location of the text, wherein the location of the text refers to both the location of the text within the image and the location of different portions of text relative to one another. For example, a captured image may be of an intersection with a WALMART and a BURGER KING on the left side of the road and a LOWES and a SAM'S CLUB on the right side of the road. As discussed above, the extracted metadata can include the location of the text, so we can use the location of the sign names to increase a confidence level in a match.

A second stage of a scene recognition algorithm in accordance with the principles of the disclosure of the present application can use various image matching algorithms as are known in the art. One of ordinary skill will recognize that various image matching algorithms are known to have different strengths and weaknesses. Some algorithms are more tolerant of changing light conditions, some are more tolerant of image noise, and some are known for processing speed. Thus, in accordance with the principles of the disclosure of the present application, different image matching algorithms can be available and selected according to a current driving environment. While one "standard" algorithm can be relied upon for comparison of most images, other image matching algorithms can be selected if certain environmental conditions are present (e.g., the current speed of the car is greater than a predetermined speed, or it is nighttime). In addition to the daylight conditions and other environment conditions, the matching algorithm's speed can be a consideration. A balance between a fast response time and accuracy under different conditions is beneficial in most instances. The type of processing capabilities of the device that analyzes captured images can also be a factor in selecting one image matching algorithm for certain implementations and another matching algorithm for different implementations.

Based on how similar the image matching algorithm determines a current image is to a stored image, the first baseline confidence level can be adjusted either up or down. This adjusted confidence level can then be compared to the predetermined threshold to determine if a match occurred.

Because the image matching analysis can take a longer time relative to determining whether or not there is matching metadata, this second stage of scene recognition can be skipped altogether if the first baseline confidence level is below a predetermined threshold. Similarly, the second stage can be skipped if the first baseline confidence level is so great as to be above a predetermined threshold. If substantially all of the text from the current image matches the metadata of a stored image and the location of the text also matches, the event, or action, associated with the stored image can be triggered without performing the actual image comparison.

The above description envisions a radar detector that can be coupled with an image acquisition device and an image analysis processor. In this way, the radar detector may be provided with image metadata that allows its own control circuitry to determine operational parameters. For example, alerts may be muted based on recognizing that the metadata relates to known situations or circumstances that are typically false positives. Alternatively, the image metadata can include identification of a current speed limit which then becomes a new threshold for when to mute or not mute alerts about detected radar signals.

Example Pattern Recognition Scenarios

As an initial step, an image of a street sign is acquired and analyzed so as to determine one or more portions of text from that street sign. Based on the extracted metadata, the following types of pattern recognition can be accomplished:

Example #1

A 35 MPH speed limit sign is recognized. The smart phone app can automatically change the radar detector threshold to 35 MPH (e.g., via a product similar to Savvy® for V1® detectors). Changing the threshold in this manner causes all alerts on the radar detector to be muted if the vehicle is traveling 35 MPH or less.

Example #2

A "Radar Detectors Illegal" sign is recognized. Using the smart phone app, the user is notified that radar detectors should not be used in that area.

Example #3

A photo radar warning sign is recognized. The user is notified about photo radar using the smart phone app and a radar scanning profile (e.g., temporarily disabling filtering) of the radar detector can be modified to improve detection range and response time.

Example #4

One of the "Your speed is . . . " trailers is recognized which results in temporarily muting the radar detector for all K band alerts until the trailer is no longer in an image.

Example #5

As described above, using mile markers and road designation (i.e. I-75 South) signs, the vehicle's current location can be determined. This information can be used in conjunction with a database to determine the speed limit, change the detector's behavior or notify the driver of speed traps.

In the above examples, the metadata from an image can be used to control operation of a radar detector or accessory without necessarily performing scene recognition to identify a previously stored matching image. Accordingly, certain metadata (e.g., speed limit information) that is pertinent regardless of the specific location of a vehicle can be stored such that it is not associated with any previously stored image. Thus, when an image is captured a determination can be made whether or not the current metadata from that image matches any of the stored metadata that is not necessarily associated with a specific stored image. Thus, any events, or actions, associated with that metadata can be triggered regardless of whether or not a current image matches a stored image.

One of ordinary skill will recognize that the above examples are merely provided to illustrate how broad a scope of information, or metadata, can be extracted from images and used in conjunction with a radar detector. Other categories of signs, for example, that may be of interest to radar detector usage can include school zone, construction zone, and traffic information.

In addition to pattern recognition of signs, pattern recognition to determine the brand and/or model name on the back of a nearby vehicle, or pattern recognition to recognize the vehicle profile from the front or rear, may be beneficial. Based on the vehicle detected, the way the radar detector behaves can be controlled because some vehicles are well known to cause false alarms.

Construction zones provide some interesting challenges for a radar detector system. They are a common source of false alarms, but they are also a common place for speed enforcement. Recognizing a construction zone can allow fine tuning behavior of the detector for this environment. For example, one possible configuration would be to mute one radar band and increase the sensitivity on another one. One of ordinary skill will recognize a number of other techniques or strategies could be used to reduce the number of false positive alerts in the construction while not overlooking actual threats.

Pattern recognition of scenes is also contemplated within the scope of the disclosure of the present application. The app on the smartphone, or other device, can allow a user to mark a current image as being associated with a known false positive (i.e., a radar signal is detected but it is not associated with a police radar source). While image metadata (e.g., street signs, objects in the image scene) may be associated with an image that is marked, other data such as a nearby Wi-Fi signature can be detected and stored. The Wi-Fi signature can identify different, nearby wireless networks that are available and their various affiliated identifiers (e.g., BSSID, ESSID, SSID, etc.).

When a current image scene is captured it can be compared to all the marked scenes that are associated with a false positive. Based on similarity between the current scene image and the stored scenes (e.g., a comparison of their metadata or their image pixels), a determination can be made as to whether the current scene matches one of the marked scenes. The respective Wi-Fi signature associated with each of the marked scenes can be used as secondary verification of the scene recognition. Thus, when the current image matches one of the marked, stored images, the radar detector's behavior can be modified so as to eliminate the false alarm, for example, or to perform whatever event has been associated with that marked image.

For opposite purposes, the user can mark a current scene as a known radar trap location. When the current scene matches one of those stored scenes marked as a known trap, the user can be notified and the radar detector's behavior can be changed to improve detection.

In general, scene analysis, or scene recognition, takes as input a series of images, each of which is analyzed. The analysis extracts features and metadata associated with an image and determines if the image matches an image that has previously been marked and stored. As mentioned above, metadata about the image rather than the entire pixel information of the image may be stored and non-image data may be acquired (e.g., a nearby Wi-Fi-signature) to be stored in association with the image. When marking an image using the app, the user is presented with a variety of choices of how to describe the image scene (e.g., a false positive, a known speed trap, etc.). Based on that description associated with a marked image, the radar detector's behavior can automatically be modified when a matching image is once again encountered. The modification of the radar detector's behavior can include muting/unmuting alarms, increasing sensitivity, filtering certain bands, and the like.

Embodiments of the disclosure of the present application also contemplate a number of ways to store current operating attributes of a radar detector and then restore the radar detector's behavior to the way it behaved before a particular scene was recognized. For example, the radar detector's behavior can be restored after a predetermined amount of time has elapsed since a matching scene was first detected, or the elapsed time can be measured from the last time a matching scene was detected. Alternatively, such as for example, when the matching scene involves a store sign (e.g., WALMART, WALGREENS, etc.) the modified detector behavior can last only during the period in which the sign is recognized being present in a current image.

One of ordinary skill will recognize that there are more complex ways to determine how a radar detector's behavior can be modified based on scene, or pattern, recognition. For example, when muting alerts based on a speed limit sign, the muting can be stopped if: a) a speed limit sign is not recognized for a specified time; b) a different speed limit sign is recognized; or c) another pattern is recognized (e.g., false positive location, speed trap location, etc.) that overrides the speed limit functionality.

One of ordinary skill will recognize that there are a number of ways to reduce computational complexity of the image analysis contemplated within the scope of the present disclosure. For example, the image scene may include portions of the vehicle's dashboard and gauges as well as portions viewed through the front windshield of the vehicle. The white lines, yellow lines, and dashed lines on the roadway can be used to help orient an image so that relative terms such as "top", "lower", "right", "left", etc. can be used in conjunction with an image. Fixed portions of the vehicle (e.g., the hood) can be used to help orient an image as well. Other vehicles and signs are not going to be found in the part of the image that corresponds to the vehicle's dashboard. Highway and exit signs are likely to be encountered in an upper region of an image (e.g., if the sign is mounted on an overpass) or in a right-most region of the image. Thus, analyzing and performing pattern recognition can be limited to those regions or portions of an image where a specific object may most-likely be encountered.

The portions of an image that are analyzed for street signs may be configured as part of the app during its design process. Additionally, the definitions of which portions of an image are searched for which types of objects can be configured by a user. Because a user has freedom to orient a camera and, thus, has the freedom to determine the portion of the nearby environment within the field-of-view of the camera, the app can be configured to allow the user to select which portions of an image are likely or not likely to include a particular type of object.

As one example, the app can visually present a rectangle that represents the entire field-of-view of the camera. The user can also be presented with a list of objects that are useful in pattern recognition (e.g., street sign, speed limit sign, mile marker sign, exit sign, interstate sign, vehicle profile, store logo, etc.) Once the user selects an object, they can associate with that object a region of the image where that object is likely to be encountered. For example, using the user interface of the app, the user can draw a rectangle or polygon on the field-of-view rectangle. The image analysis processor may then limit image analysis for that particular object to that user-specified region. One of ordinary skill will recognize that functionality can be included within the app to associate more than one object with a single region or to associate an object with two different, non-contiguous regions of the image.

The app can also include a preview screen to aid in camera mounting and aiming. The preview screen can be used with any of the types of image stream sources discussed above. In particular, the preview screen functionality may not necessarily be part of the app described herein but can be provided by a separate, standalone app. It is beneficial that during use of the preview screen, text, shapes and patterns can be recognized with respect to the image(s) used when aiming and mounting the camera.

Additionally, to reduce the amount of aiming configuration a user can perform, specific fixed mounts can be designed for particular vehicles and particular image capture devices. Specifying the vehicle and the image capture device will result in a priori knowledge of what the field of view of the image capture device will be. Also, design and use of an image capturing accessory of the radar detector manufacturer can reduce the number of possible permutations about how third-party devices can be mounted or aimed. Other options include using a device that captures a panoramic image. The wide view of these devices allows for significant variation in the aiming of the camera. Alternatively, an accessory to accommodate multiple cameras can be used. For example, such an accessory that would have three cameras can be designed to be mounted on the center of the dashboard. There would be a left, right and center facing camera, which would effectively increase the field of view. The accessory could include mounting instructions to help increase the likelihood of capturing a beneficial field of view.

Determine Vehicle Speed (Step 306)

In some of the example scenarios described above, the speed of the vehicle is useful, in conjunction with other pattern recognition determinations, in determining how to modify behavior of a radar detector. The speed of the vehicle can be determined using pattern recognition such as, for example: a) identifying mile marker signs and elapsed time between them; b) analyzing an image of the vehicle's speedometer; c) analyzing an image of the vehicle's odometer and an amount of elapsed time; or d) analyzing at least two images to determine apparent motion of fixed elements (e.g., a speed limit sign).

In other instances the vehicle speed information can be read from an OBD-II port, the vehicle's infotainment system (e.g., FORD SYNC), or some other accessory of the vehicle.

Regardless of the method of determining the vehicle's speed, this information can be made available to the app, to the radar detector, the image analysis processor, and third party devices or accessories and, may in some instances, be used alone or in conjunction with other image analysis or pattern recognition results to determine how to modify behavior of the radar detector or one or more accessories. For example, if the speed of the vehicle is below a preset value, then alarms, warnings and/or notifications can be muted. Also, depending on vehicle speed, a filtering profile or a detector's sensitivity can be adjusted.

Optionally Determine Vehicle Position and Direction (Step 308)

In addition to vehicle speed, and as mentioned above, image analysis and pattern recognition can be used to determine location information by recognizing street signs. For example, road designation signs (e.g., I-75 South), and mile marker signs or exit number signs can be used to determine a location and the sequence of mile marker signs can be used to determine direction. Because exit numbers also tend to increase while travelling north and east, exit number signs can also be useful in determining a direction of travel.

Once a location is determined, the radar detector's behavior can be altered by changing one or more stored profiles. As is known in the art, different operation profiles can be stored by a radar detector (or by an app associated with a radar detector). The profiles are stored in a way that allows a user to retrieve a desired profile depending on the current location or circumstances of the vehicle. Thus, the respective stored profiles can be associated with a different location.

For example, when a driver is driving south on I-75 in Ohio the image analysis and pattern recognition system described herein can recognize when the vehicle is five miles from downtown Dayton. When this pattern is recognized, the smart phone app changes the radar detector's operation profile to a "Dayton" profile. If the vehicle continues south and the system subsequently recognizes a sign for I-275 West at mile marker 16, the smart phone app can change the radar detector to a "Cincinnati" profile.

Notify an Operator about an Environment Chance (Step 310)

Changing the behavior of a radar detector based on pattern recognition as part of image analysis has been described herein. In addition to simply changing the radar detector's behavior, an operator of the vehicle, or user of the app, can also be notified about any changes in the environment based on the image analysis and pattern recognition. The notification can include audio and/or visual information and can be beneficial in providing the operator with safety or speed enforcement information, hi particular, the notification can be delivered using one or more of the devices available within the vehicle environment (as shown in FIG. 1). Such devices include, for example, an app on a smart phone (or other device), the vehicle's infotainment system, the radar detector itself, and other accessories of the radar detector.

As described herein, there are several opportunities for providing both visual and aural notifications to a user. In general, the notifications can be designed to require no interaction from the user. For example, a notification will not be displayed so as to obscure the app screen in a way that prompts a user to want to move the notification. Rather than being dismissible (i.e., requiring a user interaction), a notification can timeout after a specified time. The timeout interval can be predetermined in the system or be configurable by a user. Also, a notification can persist as long as the condition generating that notification exists. For example, a construction zone notification can stay on the screen until an "end construction zone" sign is captured and identified in an image.

As described herein there are a plurality of different notification events that can occur (e.g., "switching to Dayton profile", "entering a construction zone", "radar detectors are illegal", etc.) and different types of notification methods (e.g., the radar detector, the app, a remote display, an accessory, etc.). Thus, the app described herein can offer a user a variety of different configurable items. For example, a configuration interface presented to a user could list all the different types of notifications that can occur. The user can select a notification type and then be presented with all the available notification methods. Accordingly, a user can select a respective set of notification methods that are associated with each notification event. When a notification event occurs, the user can be notified using all the configured notification methods associated with that particular event.

Modify Radar Detector Operation Based on Image Analysis (Step 312)

As provided in many of the above-discussed examples, when a particular pattern is recognized during image analysis, the behavior of the radar detector can be changed in a variety of different ways. A wide variety of detector operations can be modified such as: a) the volume of the alert can be raised or lowered; b) a different visual indicator can be used such as a special, or modified, symbol on the app user interface to indicate an alert muted due to pattern recognition; c) hide the alert completely on the radar detector display or an accessory display; or d) in general, the information and format of the display and sound of the app can be modified based on pattern recognition and image analysis determinations.

Other types of behavior modifications can include altering the logic of the filtering algorithms based on the current environment. For example, the verification requirements for determining a true threat can be reduced when a photo radar warning sign has recently been identified in an image.

Also, the swept RF spectrum can be changed. For example, certain parts of a radar band can be ignored if a vehicle that is known to cause false alarms is identified in an image.

An accessory which works in conjunction with the radar detector can have its behavior modified as well. For example, an accessory that sets a speed threshold below which all radar alerts are muted can have its behavior modified as discussed above such that the speed threshold is changed based on pattern recognition related to identifying a current speed limit from a speed limit sign in the current image.

Aspects of the disclosure of the present application may be implemented entirely as hardware, entirely as software (including firmware, resident software, micro-code, etc.) or by combining software and hardware implementation that may all generally be referred to herein as a "circuit," "module," "component," or "system." Furthermore, aspects of the disclosure of the present application may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the disclosure of the present application may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python. Ruby and Groovy, or other programming languages. The program code may execute entirely or partly on a user's computer or device. In the latter scenario, a separate computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the disclosure of the present application are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 4:
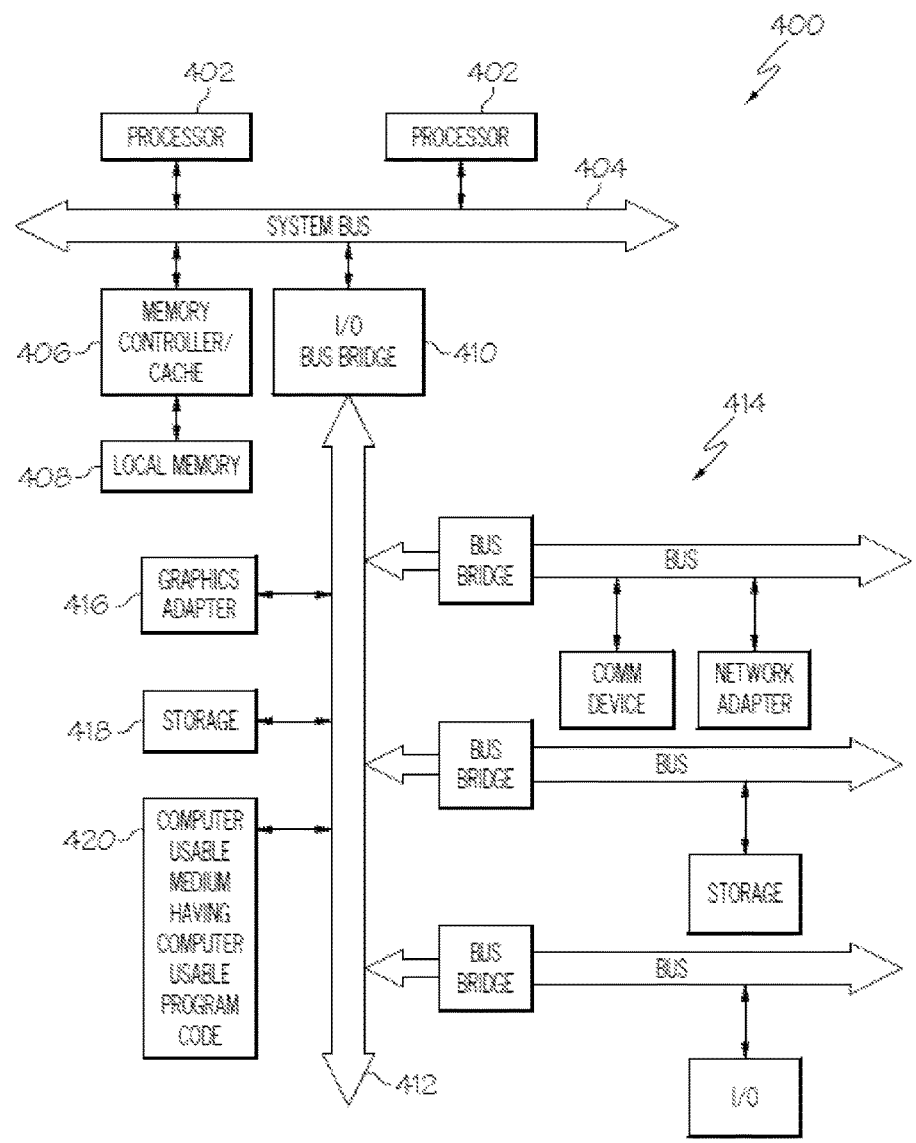
FIG. 4 is a block diagram of a data processing system in accordance with the principles of the present disclosure.

FIG. 4 depicts a block diagram of an exemplary data processing system 400 such as may be utilized to implement a hardware platform that can implement all, or portions of; an image analysis and recognition system, a device for executing an image analysis and pattern recognition app, or a radar detector accessory as set out in greater detail in FIG. 1-FIG. 3. The system 400 may comprise a symmetric multiprocessor (SMP) system or other configuration including a plurality of processors 402 connected to a system bus 404. Alternatively, a single processor 402 may be employed. Also connected to the system bus 404 is a memory controller/cache 406, which provides an interface to local memory 408. An I/O bridge 410 is connected to the system bus 404 and provides an interface to an I/O bus 412. The I/O bus 412 may be utilized to support one or more buses and corresponding devices 414, such as bus bridges, input output devices (I/O devices), storage, network adapters; etc. Network adapters may also be coupled to the system to enable the data processing system 400 to become coupled to other data processing systems or remote printers or storage devices through intervening private or public networks.

Also connected to the I/O bus 412 may be devices such as a graphics adapter 416, storage 418 and a computer usable storage medium 420 having computer usable program code embodied thereon. The computer usable program code may be executed to perform any aspect of the disclosure of the present application, for example, to implement any aspect of any of the methods, computer program products and/or system components illustrated in FIG. 1-FIG. 3.

The flowchart and block diagrams in the Figures illustrate the architecture, functionality, and operation of possible implementations of systems, methods and computer program products according to various aspects of the disclosure of the present application. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While particular embodiments have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for a vehicle comprising:
a radar detector configured to detect a police radar signal;
a communication interface configured to receive information about an image of an environment of the vehicle; and
a controller in communication with the radar detector and the communication interface and configured to determine a speed of the vehicle based on the information about the image and to change at least one operating characteristic of the radar detector based on the information about the image received by the communication interface.

2. The apparatus of claim 1, comprising:
an image analyzer configured to analyze the image and determine the information about the image; and
the image analyzer further configured to communicate the information about the image to the communication interface.

3. The apparatus of claim 2, comprising:
a camera configured to capture the image and communicate the image to the image analyzer.

4. The apparatus of claim 1, comprising:
a data storage device, in communication with the controller, configured to store respective metadata about a plurality of roadway-related attributes.

5. The apparatus of claim 4, comprising:
the controller further configured to identify one of the respective metadata that matches the information about the image; and
the controller further configured to change the at least one operating characteristic based on the matching one of the respective metadata.

6. The apparatus of claim 1, comprising:
the communication interface further configured to receive at least a portion of the image of the environment; and
a data storage device, in communication with the controller, configured to store a plurality of images.

7. The apparatus of claim 6, comprising:
the controller further configured to identify one of the plurality of images that matches the at least a portion of the image of the environment; and
the controller further configured to change the at least one operating characteristic based on the matching one of the plurality of images.

8. The apparatus of claim 1, comprising:
the communication interface further configured to receive at least a portion of the image of the environment; and
a data storage device, in communication with the controller, configured to store respective metadata about a plurality of roadway-related attributes and configured to store a plurality of images.

9. The apparatus of claim 8, comprising:
the controller further configured to:
identify one of the respective metadata that matches the information about the image;
determine a subset of the plurality of images based on the matching one of the respective metadata;
identify one of the subset of the plurality of images that matches the at least a portion of the image of the environment; and
change the at least one operating characteristic based on the matching one of the subset of the plurality of images.

10. The apparatus of claim 1, comprising:
the controller in communication with the radar detector and the communication interface and configured to receive a speed of the vehicle; and
the controller further configured to change at least one operating characteristic of the radar detector based on the information about the image and the speed of the vehicle.

11. The apparatus of claim 1, wherein the information about the image relates to at least one of: an exit sign, a road identifier, a mile-marker identifier, and a speed limit.

12. The apparatus of claim 1, wherein the information about the image relates to at least one of: a neighboring vehicle, the environment of the vehicle being a construction zone, a wireless network signature, and a neighboring retail establishment.

13. The apparatus of claim 1, wherein the at least one operating characteristic of the radar detector relates to:
muting a warning, selecting a stored operation profile, adjusting a detector sensitivity, disabling an alarm, disabling a frequency band of the detector, and setting a radar detector speed threshold.

14. The apparatus of claim 1, wherein the environment of the vehicle comprises an environment outside of the vehicle.

15. The apparatus of claim 1, wherein the environment of the vehicle comprises an environment inside the vehicle.

16. The apparatus of claim 15, wherein the image is an image of at least a portion of a dashboard of the vehicle.

17. A method for operating a radar detector in a vehicle comprising:
scanning a plurality of frequencies, by the radar detector, to detect a police radar signal;
receiving, via a communication interface, information about an image of an environment of the vehicle;
based on the information about the image, determining a speed of the vehicle; and
changing at least one operating characteristic of the radar detector based on the information about the image.

18. The method of claim 17, comprising:
analyzing, by an image analyzer, the image to determine the information about the image; and communicating the information to the communication interface.

19. The method of claim 18, comprising:
capturing the image and communicating the image to the image analyzer.

20. The method of claim 17, comprising:
storing, in a data storage device, respective metadata about a plurality roadway-related attributes.

21. The method of claim 20, comprising:
identifying one of the respective metadata that matches the information about the image; and
changing the at least one operating characteristic based on the matching one of the respective metadata.

22. The method of claim 17, comprising:
receiving at least a portion of the image of the environment; and
storing, in a data storage device, a plurality of images.

23. The method of claim 22, comprising:
identifying one of the plurality of images that matches the at least a portion of the image of the environment; and changing the at least one operating characteristic based on the matching one of the plurality of images.

24. The method of claim 17, comprising:
receiving at least a portion of the image of the environment; and
storing in a data storage device:
respective metadata about a plurality of roadway-related attributes, and
a plurality of images.

25. The method of claim 24, comprising:
identifying one of the respective metadata that matches the information about the image;
determining a subset of the plurality of images based on the matching one of the respective metadata;
identifying one of the subset of the plurality of images that matches the at least a portion of the image of the environment; and
changing the at least one operating characteristic based on the matching one of the subset of the plurality of images.

26. The method of claim 17, comprising:
changing the at least one operating characteristic of the radar detector based on the information about the image and the speed of the vehicle.

27. The method of claim 17, wherein the information about the image comprises information about a speedometer of the vehicle.

28. The method of claim 17, wherein the information about the image relates to at least one of: an exit identifier, a road identifier, a mile-marker identifier, and a speed limit.

29. The apparatus of claim 17, wherein the information about the image relates to at least one of: a wireless network signature, a neighboring vehicle, the environment of the vehicle being a construction zone, and a neighboring retail establishment.

30. The method of claim 17, wherein the at least one operating characteristic of the radar detector relates to:
muting a warning, selecting a stored operation profile, adjusting a detector sensitivity, disabling an alarm, disabling a frequency band of the detector, and setting a radar detector speed threshold.

31. The method of claim 17, wherein the environment of the vehicle comprises an environment outside of the vehicle.

32. The method of claim 17, wherein the environment of the vehicle comprises an environment inside the vehicle.

33. A method for operating a radar detector in a vehicle comprising:
scanning a plurality of frequencies, by the radar detector, to detect a police radar signal;
receiving, via a communication interface, information about an image of an environment of the vehicle;
receiving at least a portion of the image of the environment;
storing in a data storage device:
respective metadata about a plurality of roadway-related attributes, and a plurality of images;
identifying one of the respective metadata that matches the information about the image;
determining a subset of the plurality of images based on the matching one of the respective metadata;
identifying one of the subset of the plurality of images that matches the at least a portion of the image of the environment; and
changing at least one operating characteristic based on the matching one of the subset of the plurality of images.

34. An apparatus for a vehicle comprising:
a radar detector configured to detect a police radar signal;
a communication interface configured to receive information about an image of an environment of the vehicle;
a controller in communication with the radar detector and the communication interface change at least one operating characteristic of the radar detector based on the information about the image received by the communication interface;
the communication interface further configured to receive at least a portion of the image of the environment;
a data storage device, in communication with the controller, configured to store respective metadata about a plurality of roadway-related attributes and configured to store a plurality of images; and
the controller further configured to:
identify one of the respective metadata that matches the information about the image;
determine a subset of the plurality of images based on the matching one of the respective metadata;
identify one of the subset of the plurality of images that matches the at least a portion of the image of the environment; and
change the at least one operating characteristic based on the matching one of the subset of the plurality of images.

* * * * *